United States Patent [19]

Nakajima

[11] Patent Number: 4,961,190
[45] Date of Patent: Oct. 2, 1990

[54] (1+N) HITLESS CHANNEL SWITCHING SYSTEM

[75] Inventor: Masahiro Nakajima, Tokyo, Japan

[73] Assignee: NEC Corporation, Tokyo, Japan

[21] Appl. No.: 251,643

[22] Filed: Oct. 3, 1988

[30] Foreign Application Priority Data

Oct. 2, 1987 [JP] Japan ................................ 62-248082

[51] Int. Cl.$^5$ ............................................. G06F 11/10
[52] U.S. Cl. ...................................... 371/8.2; 371/5.1
[58] Field of Search ........................... 371/8.2, 5.1, 5.5

[56] References Cited

U.S. PATENT DOCUMENTS

| | | | |
|---|---|---|---|
| 3,681,694 | 8/1972 | Sarati | 371/8.2 |
| 4,234,956 | 11/1980 | Adderley et al. | 371/8.2 |
| 4,365,247 | 12/1982 | Bargeton et al. | 371/8.2 |
| 4,677,619 | 6/1987 | Kawai | 371/8.2 |
| 4,686,675 | 8/1987 | Morimoto et al. | 371/8.2 |
| 4,774,703 | 9/1988 | Force et al. | 371/8.2 |
| 4,799,237 | 1/1989 | Itoh | 371/8.2 |

Primary Examiner—Charles E. Atkinson
Attorney, Agent, or Firm—Sughrue, Mion, Zinn, Macpeak & Seas

[57] ABSTRACT

A (1+N) (N≧1) hitless channel switching system of a digital transmission system having an error correction function in which a transmitting side is connected to a receiving side through N regular channels and a single standby channel, includes in the receiving side, a detecting unit, a channel degradation determination unit, and a switching unit. The detecting unit detects a bit error rate of each channel before error correction. The channel degradation determination unit determines channel degradation in accordance with the detected bit error rate. The switching unit switches a degraded channel to the standby channel with non-interruption in accordance with information from the channel degradation determination unit.

2 Claims, 4 Drawing Sheets

(1+N) HITLESS CHANNEL SWITCHING SYSTEM

BACKGROUND OF THE INVENTION

The present invention relates to a (1+N) hitless channel switching system, in a (1+N) digital transmission system having N regular channels and a single standby channel, for switching one of the regular channels to the standby channel with non-interruption.

FIG. 1 is a block diagram showing a basic arrangement of a non-interruption regular/standby channel switching system generally used in radio digital transmission.

In FIG. 1, a transmitting side 100 is connected to a receiving side 200 through n regular channels represented by $CH_1$ to $CH_n$ and a single standby channel represented by $CH_p$.

The transmitting side 100 comprises: switches 11 having the same arrangement and provided to the regular channels $CH_1$ to $CH_n$ to receive transmission signals $IN_1$ to $IN_n$; multiplexers 12 having the same arrangement and provided to the regular channels $CH_1$ to $CH_n$ and the standby channel $CH_p$; a pilot signal generator 16 for outputting a pilot signal; and a channel switching controller 18 for supplying a signal D to the switches 11 to control their switching operation.

When all the regular channels $CH_1$ to $CH_n$ are normal, none of the switches 11 are switched. Therefore, the pilot signal is output from the pilot signal generator 16 to the channel $CH_p$ through a line 202.

If a fault occurs on one of the regular channels $CH_1$ to $CH_n$, e.g., the channel $CH_1$, the switch 11 connected to the channel $CH_1$ is switched in accordance with the control signal D supplied from the channel switching controller 18, and a transmission signal of the channel $CH_1$ is supplied through the standby channel $CH_p$.

The receiving side 200 comprises: channel monitors 13 for monitoring channel conditions of the standby channel $CH_p$ and the regular channels $CH_1$ to $CH_n$ and outputting a standby channel condition signal B and regular channel condition signals A; demultiplexers 14 for demultiplexing the output signals from the channel monitors 13; switches 15 each for receiving the output signal from the demultiplexer 14 of the standby channel $CH_p$ at its one input terminal, receiving the output signal from a corresponding one of the demultiplexers 14 of the regular channels $CH_1$ to $CH_n$ at its other input terminal, and selecting one of the input signals in accordance with a control signal E; a pilot signal detector 17 for detecting a pilot signal from the output signal from the demultiplexer 14 of the standby channel $CH_p$; and a channel switching controller 19 for outputting a switch control signal E for controlling the switches 15 in accordance with the standby channel condition signal B from the channel monitor 13 of the standby channel $CH_p$, the regular channel condition signals A output from the channel monitors of the regular channels $CH_1$ to $CH_n$, and the output signal C from the pilot signal detector 17, and transmitting a signal F representing switching demand to the channel switching controller 18 of the transmitting side 100.

A switching sequence of hitless switching in FIG. 1 is generally performed as follows. That is, if a fault occurs on, e.g., the regular channel $CH_1$, the channel monitor 13 of the channel $CH_1$ supplies the signal A representing the fault to the channel switching controller 19. The channel switching controller 19 checks the presence/absence of the fault and the condition of the standby channel by using the standby channel condition signal B and the output signal C from the pilot signal detector 17 and then sends the switching demand signal to the channel switching controller 18 at the transmitting side 100. The channel switching controller 18 operates the switch 11 of the channel $CH_1$ by the channel switching signal D.

The channel switching controller 19 at the receiving side 200 compares the transmission signal from the regular channel $CH_1$ on which the fault occurs with the transmission signal from the standby channel. If it is determined that bits and phases of the two signals coincide with each other, the switching (hitless switching) signal E is supplied to the switch 15. The switch 15 switches its input from the demultiplexer 14 of the channel $CH_1$ to the demultiplexer 14 of the standby channel $CH_p$ and outputs it as an output signal OUT1. As a result, switching from the channel $CH_1$ on which the fault occurs is completed.

FIG. 2 is a block diagram showing a partial detailed arrangement of the system shown in FIG. 1 for monitoring channel quality by the parity check method which is conventionally often used.

At the transmitting side 100 shown in FIG. 2, a transmission signal output from the multiplexer 12 is supplied to an error correction calculator 1 and to a parity counter 4. A count obtained by the parity counter 4 is supplied to the multiplexer 12 and inserted in a predetermined time slot. The output signal of the multiplexer 12 is subjected to error correction processing of the error correction calculator 1 and then output to a channel $CH_j$ (j=1 to n).

At the receiving side 200 shown in FIG. 2, a signal subjected to error correction by an error correction circuit 2 is output to a demultiplexer 14 and a parity counter 5. The parity counter 5 performs parity counting similar to that of the parity counter 4 at the transmitting side 100 and outputs the count to a parity comparator 6. The demultiplexer 14 separates the parity inserted in the time slot by the multiplexer 12 at the transmitting side 100 and outputs the parity to the parity comparator 6. The parity comparator 6 compares the inputs from the parity counter 5 and the demultiplexer 14 and outputs a parity error signal based on the comparison result. A channel quality determination circuit 7 performs quality determination of the channel in accordance with the parity error signal and outputs the determination information to the channel switching controller 19.

However, since the channel quality monitoring using the parity bit in the conventional channel switching system is based on channel quality of a bit sequence after error correction, even if a large number of bit errors occur in the bit sequence before error correction, the bit errors of the bit sequence after error correction are maintained well. Therefore, according to the conventional method in which channel quality determination is performed by parity check after error correction, channel quality degradation caused by propagation path conditions cannot be detected in a short time period. In addition, as represented by a line AC in FIG. 4 showing an error rate characteristic before and after correction obtained when an error correction function is present, a degradation speed (speed of degradation in carrier wave power/noise ratio) is high, that is, for example, a time interval from an error rate $10^{-6}$ represented by a dotted line CL in FIG. 4 to system outage, e.g., an error rate $10^{-3}$ represented by a dotted line DL in FIG. 4 is short. Accordingly, a time usable for detecting information of channel degradation is short. As a result, system outage occurs before the transmission path is restored by channel switching.

SUMMARY OF THE INVENTION

It is, therefore, an object of the present invention to eliminate the above drawback of the conventional technique and provide an apparatus capable of rapidly and reliably detecting a fault of a propagation path and restoring the propagation path by hitless switching in switching of a radio digital transmission system having an error correction function.

A (1+N) hitless channel switching system (N 1) of a digital transmission system having an error correction function according to the present invention comprises a detecting means, provided at a receiving side, for detecting a bit error rate before error correction, and a means for performing channel switching with non-interruption in accordance with the detected bit error rate.

DETAILED DESCRIPTION OF THE PREFERRED EMBODIMENT

An embodiment of the present invention will be described in detail below with reference to the accompanying drawings.

Figure 1:
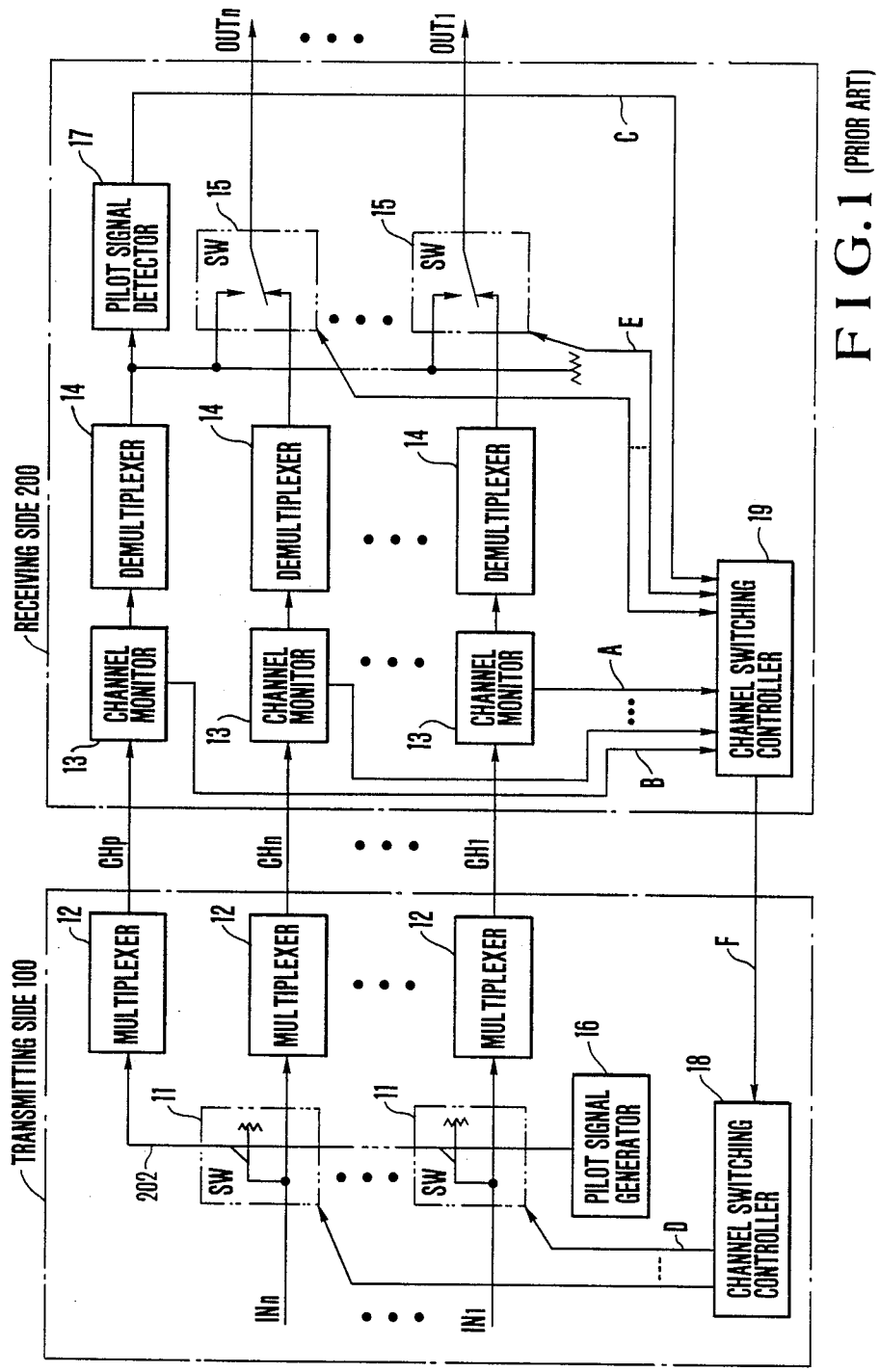
FIG. 1 is a block diagram showing a basic arrangement of a (1+N) hitless channel switching system common to a conventional technique and the present invention.
Figure 2:
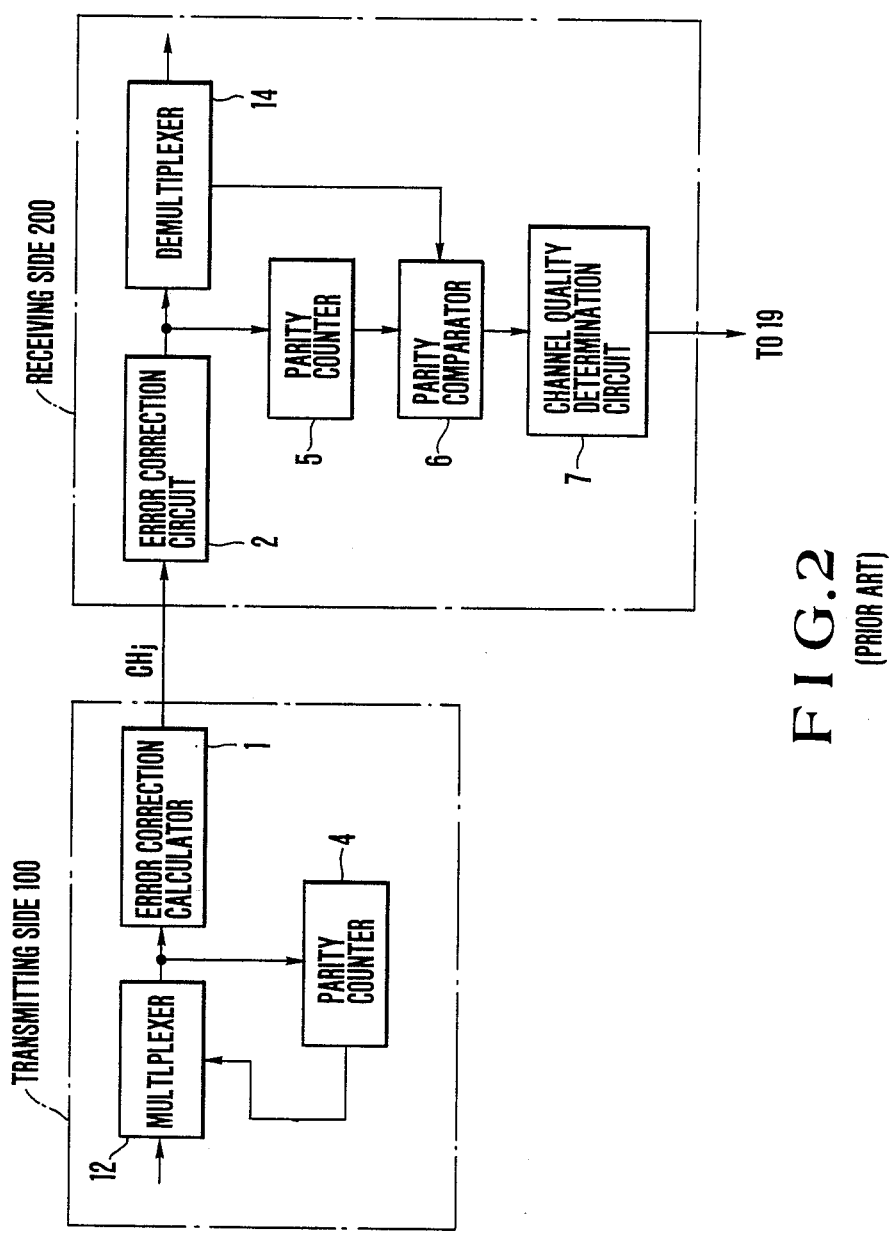
FIG. 2 is a block diagram showing an arrangement according to the conventional technique of a part of the system shown in FIG. 1.
Figure 3:
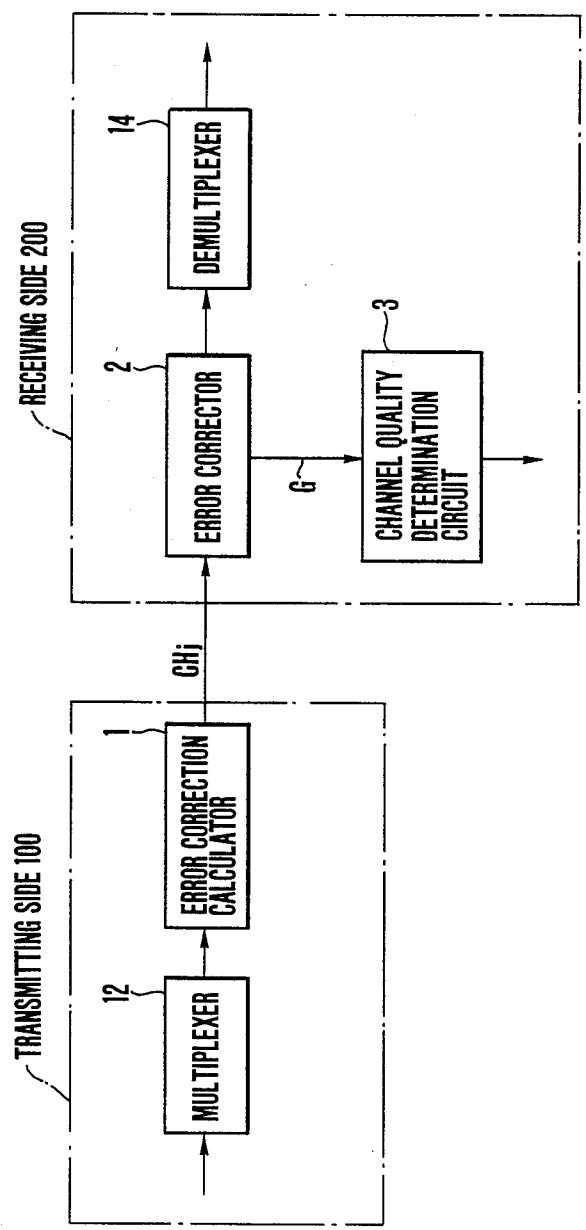
FIG. 3 is a block diagram showing an arrangement according to an embodiment of the present invention.
Figure 4:
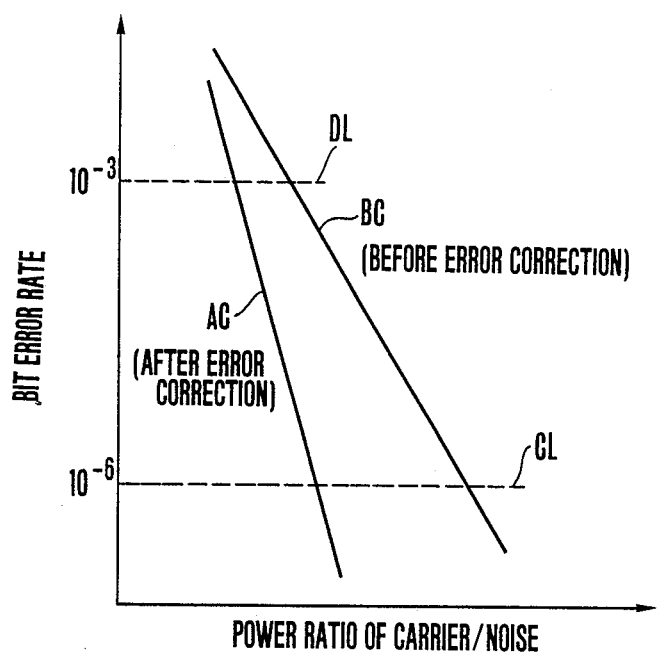
FIG. 4 is a graph for explaining an operation and an effect of the present invention.

FIG. 3 shows an arrangement of a main part of the embodiment of the present invention. In a system having an error correction function, at a transmitting side 100, an output signal from a multiplexer 12 is supplied to an error correction calculator 1, and the error correction calculator 1 performs calculation in accordance with an error correction system. The calculation result is transmitted to a receiving side 200 using a time slot (redundant bit) through a corresponding channel $CH_j$. At the receiving side 200, an error correction circuit 2 corrects a bit error in a bit sequence before error correction using the error correction calculation result according to the error correction system and the contents of the redundant bit and outputs a signal subjected to error correction to a demultiplexer 14 and a signal G representing this bit error rate. At this time, the signal G representing the bit error rate is generated on the basis of channel quality of the bit sequence before error correction. Therefore, as shown by a line BC in FIG. 4, a time interval from channel quality degradation information detection (e.g., an error rate $10^{-6}$ point) to system outage (e.g., an error rate $10^{-3}$ point) is sufficient as compared with that in channel quality determination based on a bit sequence after error correction.

A channel quality determination circuit 3 performs channel quality determination of the bit sequence before error correction by using the error correction control signal G and outputs a signal A representing channel quality degradation.

As has been described above, according to the present invention, even in the system having the error correction function, a switching apparatus can sufficiently follow a quality degradation speed of a propagation path because channel quality monitoring is performed before error correction.

What is claimed is:

1. A (1+N) (N≧1) hitless channel switching system of a digital transmission system having an error correction function in which a transmitting side is connected to a receiving side through N regular channels and a single standby channel, comprising:

in said receiving side, error correcting means for generating error corrected signals, said error correcting means detecting a bit error rate of each channel before error correction is performed;

channel degradation determining means for determining a degradation of a quality of one of said N regular channels on the basis of the bit error rate detected by said error correcting means before error correction is performed to output an information designating the one of said N regular channels; and switching means for switching the one of said N regular channels to said standby channel with non-interruption in accordance with the information output from said channel degradation determining means.

2. A (1+N) hitless channel switching system of a digital transmission system, in which a transmitting side is connected to a receiving side through N regular channels and a single standby channel, for transmitting N communication signals, comprising:

in said transmitting side, (N+1) multiplexers connected to said N regular channels and said standby channel;

(N+1) error correction calculators for performing error correction calculations of outputs from said (N+1) multiplexers and outputting results of the error correction calculations to said (N+1) channels, respectively;

channel switching means for causing, when a fault occurs on one of said N regular channels, said multiplexer and said error correction calculators connected to said standby channel to output the transmission signal corresponding to said regular channel on which the fault occurs, in response to a first control signal; and first control means for outputting the first control signal in response to a signal representing an occurrence of the fault supplied from said receiving side; and in said receiving side, error correcting means for performing error corrections of reception signals supplied through said standby channel and said regular channels, respectively, to output corrected signals and for detecting bit error rates of said N regular channels and said standby channel before the error corrections are performed;

channel quality determining means for determining qualities of said N regular channels and said standby channel on the basis of the bit error rates detected by said error correcting means before the error corrections and the corrected signals output from said error correcting means;

second control means for supplying the signal representing the switching demand to said transmitting side and outputting a second control signal in accordance with the signal output from said channel quality determining means; and switching means for switching a reception signal supplied through the one of said N regular channels to a reception signal supplied through said standby channel and outputting the signal in response to the second control signal.

* * * * *